June 24, 1930. J. D. RAUCH 1,765,739
CONTINUOUS TREAD TRUCK
Filed Aug. 27, 1926 2 Sheets-Sheet 1
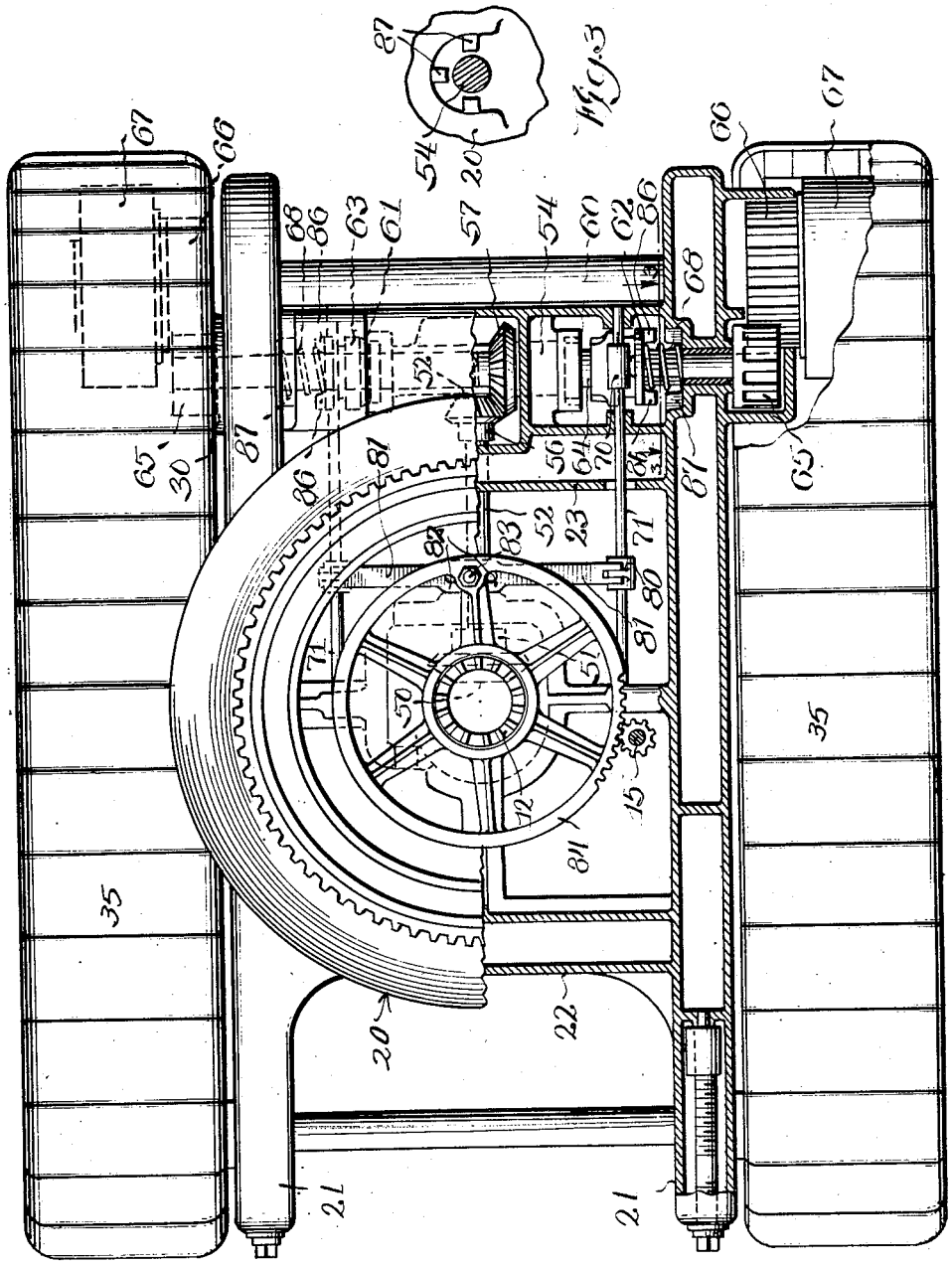

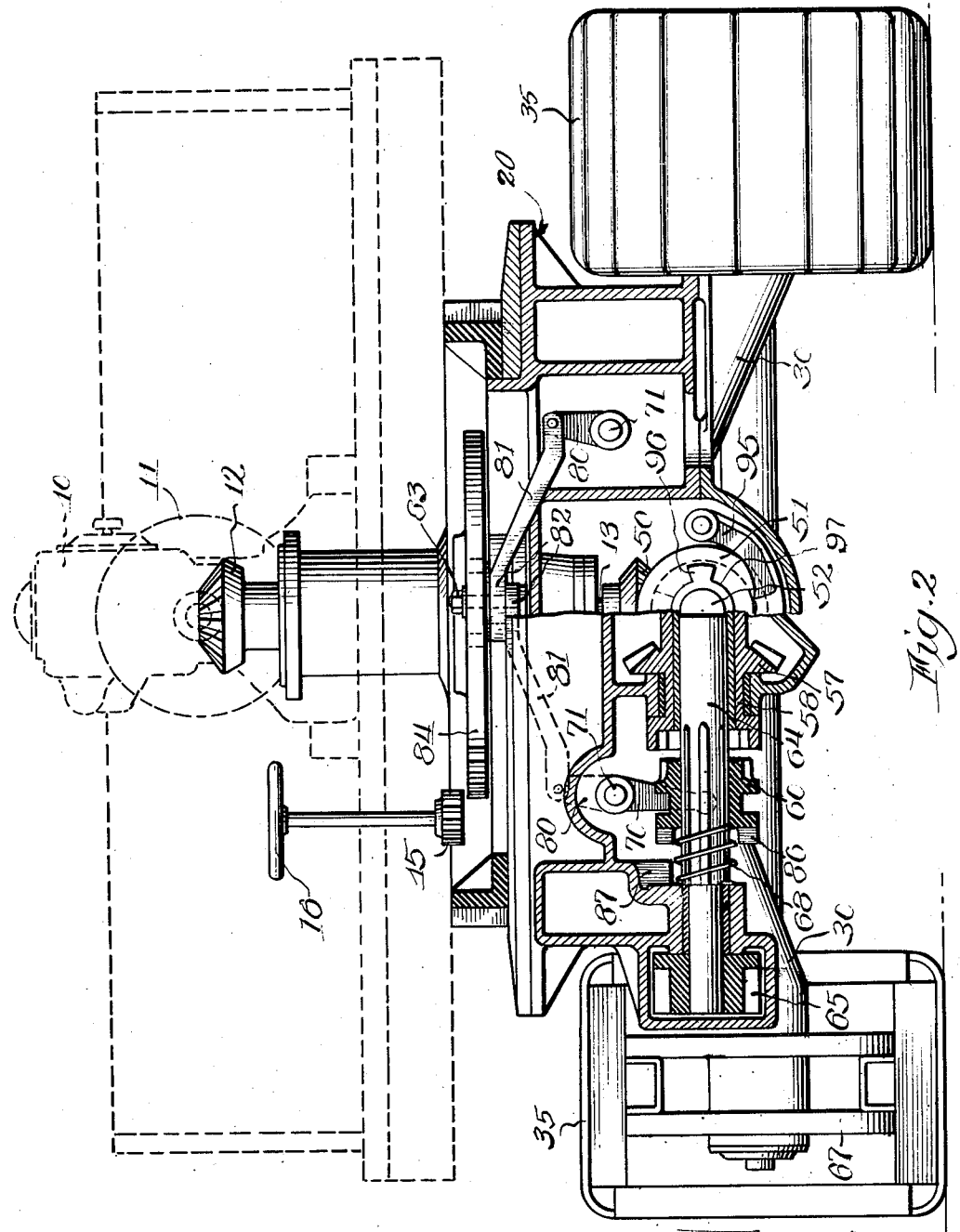

Patented June 24, 1930

1,765,739

UNITED STATES PATENT OFFICE

JOHN D. RAUCH, OF LIMA, OHIO, ASSIGNOR TO THE OHIO POWER SHOVEL COMPANY, OF LIMA, OHIO, A CORPORATION OF OHIO

CONTINUOUS-TREAD TRUCK

Application filed August 27, 1926. Serial No. 131,936.

This invention relates to improvements in continuous tread trucks especially adapted for power shovels, cranes, and the like, although not restricted to such use.

In a prior application filed by me on May 8, 1926, and bearing Serial No. 107,537, I have disclosed a machine of the character above described, having as one of its principal features a novel form of driving and steering mechanism.

Among the objects of the present invention, is to provide an improved form of steering mechanism adapted for tread mechanisms of the general type disclosed in said application.

A further object is to provide an improved locking mechanism for the tread devices whereby either of the two treads may be positively restrained from movement at will.

Other objects of the invention will appear as the description proceeds.

The invention may best be understood by reference to the accompanying drawings, in which Figure 1 is a plan view of a truck constructed in accordance with my invention, with parts broken away to show the construction of the driving mechanism forming the subject matter of the present application.

Figure 2 is a transverse sectional view taken on line 2—2 of Figure 1, and showing the superimposed turntable member of a power shovel, crane, or the like, in dotted lines.

Figure 3 is a detail view showing a part of the frame forming one of the tread locking members.

Referring now to details shown in the drawings, it will be seen in Figure 2 that the parts of the truck body are shown in full lines, while a suitable turntable, such as may be mounted thereon, is indicated in dotted lines. The specific type of mechanism to be carried on the turntable need not be illustrated in detail, excepting to note that a power device such as a motor indicated at 10, is connected through gear 11 to a bevel pinion 12 on shaft 13 disposed coaxially of the turntable and from which power is transmitted to the tread mechanism, as will hereinafter more fully appear. Drive controlling pinion 15 and wheel 16 associated therewith, are also carried by the turntable in position to be cooperatively connected with the truck drive controlling devices in any position of rotation of the turntable, as will also more fully appear. It will be understood, however, that the forms and types of turntables or other mechanisms to be mounted on the truck, may vary widely from the form herein indicated.

Referring more particularly to the truck, the same includes a main frame 20 preferably in the form of an integral casting, and having two longitudinally disposed side beams 21, 21 and cross frame beams 22 and 23 connecting said side beams. The beams 21, 22 and 23 are preferably made hollow to provide the desired strength and rigidity.

Connected along the lower surface of the side beams 21 are provided a plurality of axle supports 31, 31 which carry intermediate tread supporting wheels 34 forming idler bearings for the upper and lower tread flights of the continuous treads 35 in the usual manner.

Referring now to the driving connections for the continuous treads, it will be understood that power is transmitted through bevel pinions 12 on the upper end of a vertically disposed shaft 13, as already described. A bevel pinion 50 is carried on the lower end of the vertical shaft 13 and is meshed with a bevel gear 51 fixed on a longitudinally disposed shaft 52. The latter shaft has suitable bearings in the main frame, and has a bevel pinion 56 keyed thereon which meshes with a bevel gear 57 fixed on a transversely disposed sleeve member 58. Said sleeve member is journalled in bearings 54, 54 forming part of the main frame, and is provided at opposite ends with clutch jaws 60 and 61, adapted for engagement, respectively, with sliding clutch members 62 and 63, each of which is splined on a separate shaft 64. Said shafts have their adjacent ends journalled in the sleeve member 58 and extending in opposite directions therefrom to form separate drive members for each of the tread mechanisms 35, 35 through respective spur pinions 65, gears 66 and tread-driving sprockets 67.

The clutch members 62 and 63 are normally maintained in operative engagement with their respective clutch jaws 60 and 61 by springs 68 on shafts 64.

The controlling means for selectively disengaging these clutches includes a pair of yokes 70 on locking shafts 71, extending in parallel relation toward the central axis of the turntable, as shown in Figure 1. Said shafts are each provided with an upwardly extending lever arm 80, as seen in Figure 2. To each of the arms 80 is connected a link 81, having slotted end portions 82, 82 one of which overlaps the other, and having a pin 83 passing therethrough. Said pin is carried near the periphery of a control wheel 84 mounted concentrically with the axis of the turntable, as clearly shown in Figures 1 and 2. The pin 83 normally engages the outer end of each of the slots 82, and the force of springs 68, 68 keeps the clutch members 62 and 63 in engaged position. The arrangement is such that when the wheel 84 is rotated slightly from its central position to a position as shown in Figure 2, the pin 83 carries one of the links 81 therewith, but affording limited movement relative to the other link so as not to effect movement of the latter, and thereby disengages one of the clutch members such as 60, as shown. Manifestly, when the wheel is rotated in the opposite direction, clutch 61 will similarly be disengaged.

It will be seen further, that I provide each of the clutch members 60 and 61 with additional clutch jaws 86, 86 which are adapted to engage with clutch jaws 87, 87 fixed on the main frame, as shown in detail in Figure 3. This engagement is effected when the wheel 84 is rotated to an extreme position in one direction or the other, so as not only to disengage one of the clutches, but to afford the adjacent tread a positive lock against movement, as for instance, when it is desired to make a sharp turn.

The wheel 84 is controlled in any suitable manner, in the form shown said wheel having a toothed periphery 90 adapted to be detachably engaged by the controlling mechanism comprising the pinion 15 and wheel 16, heretofore described as being mounted on the turntable, and arranged for vertical sliding movement, so as to be engageable or disengageable with said wheel at will, in any position of rotation of said turntable relative to the truck frame.

Means are also provided for locking both treads against movement, as for instance, when operating the device as a power shovel or crane. In the form shown, this means comprises a latch 95 pivotally mounted on the main frame and arranged to be engageable in a series of notches 96, 96, formed about the hub 97 of beveled pinion 51, as shown in Figure 2. Said latch may be operated in any suitable manner, and thus, when both clutch members 60 and 61 are normally engaged, both of the treads may be fixed so as to afford an immovable operating support for the entire mechanism, it being noted, however, that this locking means is entirely distinct from the locking devices 86, 87 heretofore described as being provided for the separate treads and utilized for steering the truck.

Although I have illustrated and described the preferred embodiment of my invention, it should be understood that I do not wish to be limited to the exact construction shown and described, but that various changes and modifications may be made without departing from the spirit and scope of my invention.

I claim as my invention:

In a continuous tread truck and in combination with a turntable mounted thereon, power means carried by said turntable, an axially disposed vertical shaft connected with said power devices, a pair of continuous tread devices supporting said truck, and power connections between said vertical shaft and said treads including a rotatable transverse member, a pair of clutch devices at opposite ends of said transverse member for selectively connecting said member with said treads, tension means tending to force said clutches into driving engagement, and controlling means for said clutches comprising a wheel mounted coaxially with said vertical shaft, rock arms connected with said clutches, a slotted link connected to each of said rock arms and extending into mutually overlapping position adjacent said wheel and a pin carried by said wheel and engaging both of said slotted links to effect selective operation of said rock arms by movement of said wheel in opposite directions.

Signed at Lima, O. this 23 day of Aug., 1926.

JOHN D. RAUCH.